J. P. LAW.
STEERING MECHANISM FOR AUTOMOBILES.
APPLICATION FILED SEPT. 1, 1914.
1,157,628.
Patented Oct. 19, 1915.
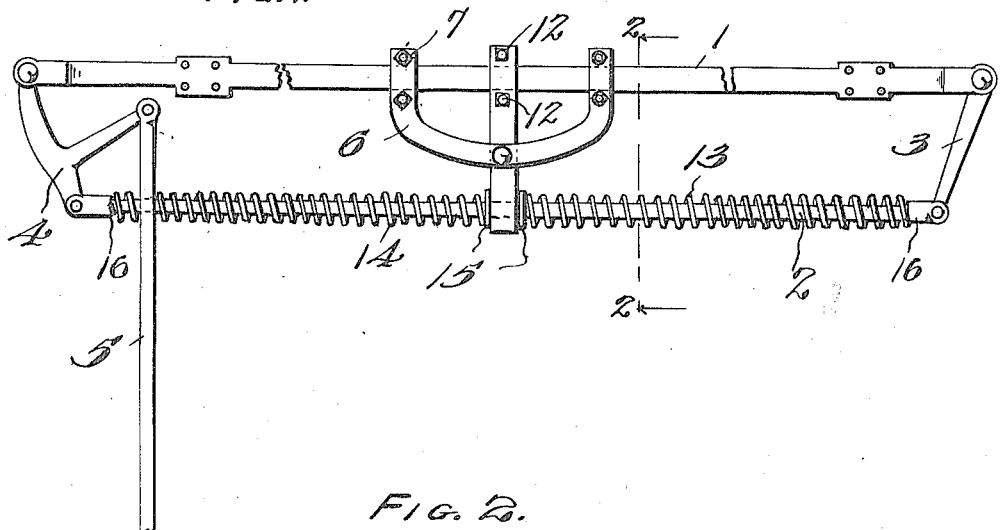
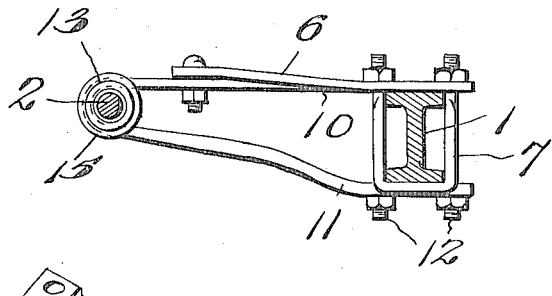
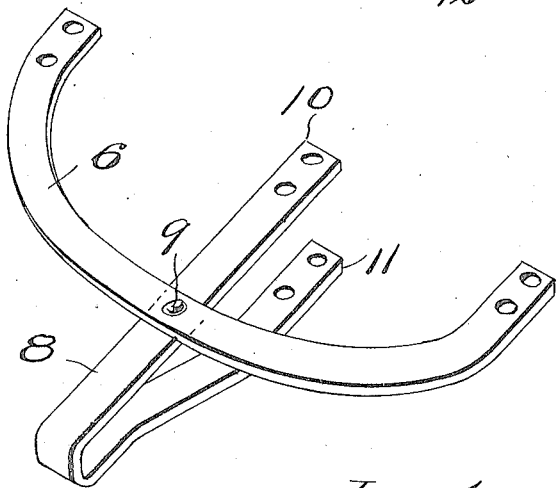
Witnesses
C. K. Davis
M. L. Newcomb
Inventor
James P. Law
By
Herman A. Phillips
Attorney

UNITED STATES PATENT OFFICE.

JAMES P. LAW, OF NOCONA, TEXAS.

STEERING MECHANISM FOR AUTOMOBILES.

1,157,628. Specification of Letters Patent. Patented Oct. 19, 1915.

Application filed September 1, 1914. Serial No. 859,720.

*To all whom it may concern:*

Be it known that I, JAMES P. LAW, a citizen of the United States of America, residing at Nocona, in the county of Montague and State of Texas, have invented certain new and useful Improvements in Steering Mechanism for Automobiles, of which the following is a specification.

The present invention relates to improvements in steering mechanism for automobiles, and is designed as an attachment to be used in connection with the front axle and the tie rod of the steering gear of an automobile, in order to render the movement of the steering mechanism more stable and also act as a cushion in absorbing jerky movements or shocks that are likely to be imposed upon the steering mechanism.

The invention consists in the combination with the front axle and the tie rod of the steering gear, of means carried by the tie rod and supported from the axle, for cushioning the movement of this tie rod, as will be hereinafter more fully described in the specification, and pointed out in the claim.

In the accompanying drawings I have illustrated one complete example of the physical embodiment of my invention showing the type of steering gear with the tie rod at the rear of the front axle, and constructed according to the best mode I have so far devised for the practical application of the principles of the invention.

It will be understood, of course, that in other types of steering gear for instance, where the tie rod is at the front of the front axle, the necessary changes will be made without departing from the spirit of my invention.

Figure 1 is a plan view showing so much of the front axle and steering gear as is necessary to illustrate the adaptation of my invention thereto. Fig. 2 is an enlarged sectional view on line 2—2 of Fig. 1. Fig. 3 is an enlarged perspective view showing the bracket and yoke embodied in the invention.

In the preferred form of my invention as exemplified in the drawings, the front axle 1, the tie rod 2, the steering levers 3 and 4, and the reach rod 5, are all of conventional or typical construction, and these parts are illustrated merely to show the relationship of my invention thereto.

In converting the existing axle and tie rod for use with my invention, I employ a curved bracket 6 which is preferably a bent strap of flat metal perforated at its ends, and secured to the axle 1 by means of the U-shape bolts 7 which are passed under and around the axle and are secured by nuts on the top of the bracket 6. There are two of these U-shape bolts 7, and they serve to anchor or clamp the bracket rigidly to the front axle.

In connection with the bracket, I employ a yoke 8 which is bolted at 9 to the bracket 6, and the ends of its arms 10—11 are perforated, and passed one under and the other one over the axle 1, so that the bolts 12 may pass from the arm 10 through the arm 11 and clamp the yoke securely to the axle midway of the bracket 6. This yoke 8 extends back from the axle, and it will be readily seen that the tie rod 2 is extended through the yoke near its end.

At the sides of the yoke, and surrounding the tie rod 2, are a pair of coil springs as 13 and 14 which bear against washers 15 one at each side of the yoke, and are confined between these washers and the cuffs 16 at each end of the tie rod 2. By means of the springs 13 and 14, the movement of the tie rod 2 is rendered regular and steady, but it will of course be understood that the tie rod 2 is free to move longitudinally through the yoke 8, the two springs 13 and 14 being only strong enough to provide for a stable and regular movement of the parts.

The operation of the device will be apparent. When the reach bar 5 is drawn toward the observer, the tie bar 2 is pulled to the left. The two springs 13 and 14 are in normal condition under compression, and the movement of the tie rod to the left therefor further compresses the spring 14 and allows the spring 13 to expand or extend itself. The reverse movement of the tie rod causes the spring 13 to be compressed, and the spring 14 expands. The constant pressure of the springs between the washers 15 and the cuffs 16 prevents all lost motion, and takes up and absorbs undue shocks to the parts, and also holds the tie rod in neutral position.

From the above description taken in connection with my drawings, it is evident that I have provided a device which fulfils the purposes of a comparatively perfect shock absorbing device for the steering mechanism of an automobile.

I claim:

The combination in an automobile steering mechanism with the front axle and tie rod, of a curved bracket with its ends secured to the axle and its body projecting toward the tie rod, a yoke bent over the tie rod and fastened at the underside of the bracket and its ends secured to the axle, a washer at each side of the yoke, a spring surrounding and confined on the tie rod and bearing against each washer.

In testimony whereof I affix my signature in presence of a witness.

JAMES P. LAW.

Witness:
L. F. FRY.